United States Patent
Mantyla et al.

(10) Patent No.: US 8,007,016 B2
(45) Date of Patent: Aug. 30, 2011

(54) GREASE INTERCEPTOR LATCHING AND RISER SYSTEM AND METHOD OF USE THEREOF

(75) Inventors: James Mantyla, Barrie (CA); Rick Parkinson, Barrie (CA); Stephen Hamilton, North Bay (CA)

(73) Assignee: Canplas Industries Ltd, Barrie, Ontario (CA)

( * ) Notice: Subject to any disclaimer, the term of this patent is extended or adjusted under 35 U.S.C. 154(b) by 925 days.

(21) Appl. No.: 11/651,836

(22) Filed: Jan. 10, 2007

(65) Prior Publication Data

US 2008/0083752 A1    Apr. 10, 2008

(30) Foreign Application Priority Data

Oct. 6, 2006  (CA) ..................................... 2562825

(51) Int. Cl.
*E05C 3/04* (2006.01)
*E05C 3/00* (2006.01)

(52) U.S. Cl. ................ 292/200; 292/240; 292/DIG. 11; 220/4.03

(58) Field of Classification Search .................. 292/200, 292/240, DIG. 11; 27/DIG. 1; 220/4.03
See application file for complete search history.

(56) References Cited

U.S. PATENT DOCUMENTS

| | | | | |
|---|---|---|---|---|
| 1,615,944 A * | 2/1927 | Hetrick | ......................... | 292/240 |
| 1,889,601 A * | 11/1932 | Heinkel | ...................... | 210/532.1 |
| 2,688,418 A * | 9/1954 | Carter | .......................... | 220/4.03 |
| 2,701,619 A * | 2/1955 | Brenner | ......................... | 210/539 |
| 2,767,008 A * | 10/1956 | Oswald | ......................... | 292/241 |
| 2,771,208 A * | 11/1956 | Chovanes | ..................... | 220/4.03 |
| 3,039,837 A * | 6/1962 | Poe | ............................. | 312/332.1 |
| 3,217,661 A * | 11/1965 | Kemp | ....................... | 105/377.08 |
| 3,560,038 A * | 2/1971 | Gunther | ......................... | 292/241 |
| 3,847,814 A * | 11/1974 | Adachi | ......................... | 210/237 |
| 3,958,821 A * | 5/1976 | Scalera | .......................... | 292/97 |
| 4,022,344 A * | 5/1977 | Roamer | ........................ | 220/4.03 |
| D255,479 S * | 6/1980 | Dye et al. | .................... | D23/268 |
| 4,674,777 A * | 6/1987 | Guelck | ......................... | 292/101 |
| 5,431,826 A * | 7/1995 | Becker et al. | ................. | 210/742 |
| 5,542,347 A * | 8/1996 | Joseph | ........................... | 99/422 |

(Continued)

FOREIGN PATENT DOCUMENTS

CA    2299134    *    2/2000

*Primary Examiner* — Carlos Lugo
(74) *Attorney, Agent, or Firm* — Hoffmann & Baron, LLP

(57) ABSTRACT

A riser kit for a grease interceptor having upwardly extending walls, an open top and a cover to close the open top. The riser kit comprises at least one collar extension having, a lower edge for engaging an upper edge of the upwardly extending walls of the grease interceptor, a middle portion forming an upward wall extension for the grease interceptor, and, a top edge sized and shaped to engage the cover to permit the cover to be secured to the extended grease interceptor. The riser kit also has a means to secure the collar extension to the grease interceptor. Also disclosed is a latch assembly for securing a cover onto a container, the latch assembly comprising a catch member secured to the container transverse to a container wall at an upper end thereof, a latch member pivotally mounted to the cover adjacent an edge thereof and positioned to register with the catch member. The latch member has a hook portion and a lever portion wherein pivoting the lever portion when the cover is positioned on the container causes the hook portion to engage and disengage with the catch member. A method of installing a wastewater grease interceptor is also disclosed.

32 Claims, 11 Drawing Sheets

U.S. PATENT DOCUMENTS

| | | | |
|---|---|---|---|
| 5,803,293 A * | 9/1998 | Lovekin | 220/4.03 |
| 6,010,022 A * | 1/2000 | Deaton | 220/4.03 |
| 6,039,362 A * | 3/2000 | Nadherny | 292/197 |
| 6,152,497 A * | 11/2000 | Vickers et al. | 292/34 |
| 6,484,451 B1 * | 11/2002 | Gavin | 52/20 |
| 6,908,004 B2 * | 6/2005 | Barr | 220/4.26 |
| 6,979,403 B2 * | 12/2005 | Rodis | 210/232 |
| 7,011,752 B2 * | 3/2006 | Broeders et al. | 210/221.2 |
| 2006/0284427 A1 * | 12/2006 | Borycki | 292/240 |

* cited by examiner

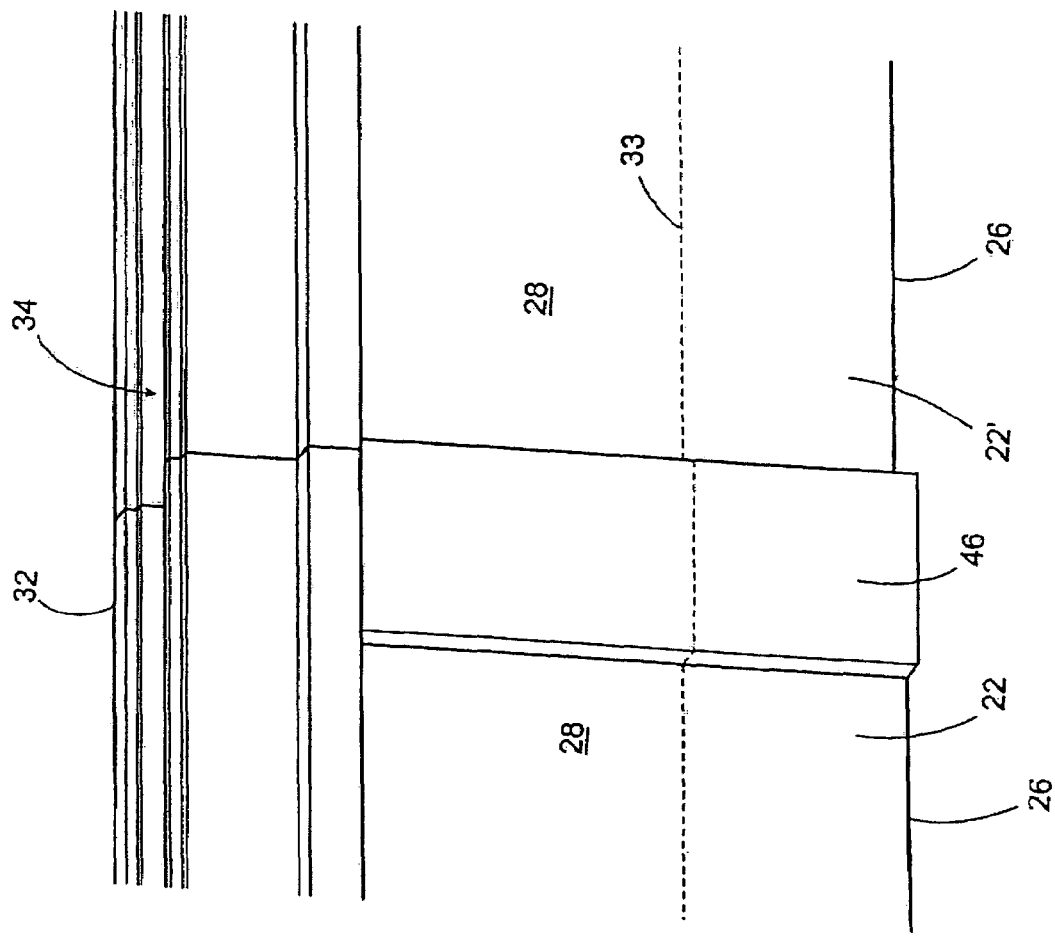

GREASE INTERCEPTOR LATCHING AND RISER SYSTEM AND METHOD OF USE THEREOF

CROSS-REFERENCE TO RELATED APPLICATION

This application claims the benefit of Canadian Application No. 2,562,825, filed Oct. 6, 2006, titled "Grease Interceptor Latching And Riser System And Method Of Use Thereof", the contents of which are incorporated by reference herein.

FIELD OF THE INVENTION

The present invention relates generally to the field of waste water management and more particularly to grease interceptor devices of the type used to remove grease and oil from wastewater before the waste water enters into a municipal wastewater system and to methods of installing such devices.

BACKGROUND OF THE INVENTION

Commercial food service establishments, such as restaurants, produce considerable amounts of organic material in their waste or drainage water which often includes high levels of grease or oil. Such materials can clog or adversely affect public wastewater and sewer systems. Most jurisdictions therefore require that such grease and oil be removed from the wastewater at the commercial establishment before it is permitted to enter the wastewater system.

To effect such removal, the commercial establishment will typically install a grease interceptor on its wastewater outlet line from its food preparation area, such as its kitchen. The purpose of the grease interceptor is to permit the free flow of wastewater, while capturing any grease or oils contained in the water. The process of grease interception involves the separating and retaining of globules of grease, fats and oils from wastewater as it passes through the grease interceptor. Typically the oily wastewater passes into the grease interceptor at one end and as the water flows through the interceptor it is slowed down, allowing the lighter than water components, such as grease and oil, to rise within the water accumulating in an upper layer in the interceptor. A fluid outlet from the grease interceptor is positioned below the level of the grease layer to permit substantially grease free wastewater to pass through the interceptor. In this way, the grease is collected in the grease interceptor and it may be periodically removed by direct bailing the grease out of the top of the grease interceptor. The grease is then' disposed of as solid waste in accordance with local regulations, for example, in dumpsters for removal to landfill sites.

Grease interceptors are typically installed below grade and in line with wastewater outlet or effluent pipes between where the kitchen is located and where the effluent pipe passes out of the building. A typical installation involves excavating a sufficiently large hole in the ground around a wastewater effluent pipe to permit the body of the grease interceptor to be placed in the hole, attached in line into the effluent pipe and to have a top of the interceptor at or above grade to permit the lid to be accessed for bailing. The excavated hole is then filled in around the grease interceptor and the floor is finished to the top edge of the grease interceptor. Ideally, the grease interceptor is installed in the ground with the upper edge being level with the floor grade and the inflow and outflow pipes connect directly to the inflow and outflow connectors of the grease interceptor in a manner to ensure proper operation of the wastewater through the interceptor.

However, a. problem with a typical installation is that, while the inflow and outflow pipe connectors on the body grease interceptor are provided at a predetermined height from the upper edge of the grease interceptor, there is no standard depth at which the wastewater pipes are located beneath the floor. Due to the need to provide a minimum slope to the pipe, and due to the position of the grease interceptor in any given pipe run being determined by what is convenient relative to the building layout, rather than how far away the sinks are, the connection to the waste water effluent pipe may be a various depths under the surface grade of the building. To preserve the wastewater gradient, in situations where the wastewater pipes are located deep below floor grade, it is common to install a grease interceptor with its upper edge positioned below floor grade, and then finish the floor to the upper edge of the grease interceptor with a downward slope from floor grade. This results in a dip in the finished floor where the grease interceptor is located which is generally aesthetically unappealing. Further it creates the tripping hazard of an uneven floor.

A further problem with conventional grease interceptors is that the cover is secured to the open top of the grease interceptor either by means of screw fasteners or quarter-turn fasteners which both have disadvantages. In the case of the screw fasteners a user must unscrew several screw-fasteners to remove the cover during periodic bailing which poses an inconvenience. While In the case of the quarter-turn fasteners the cover is more easily removed, there is another disadvantage in that the heads of the fasteners project upwardly from the floor and pose a tripping hazard or are liable to be bent or broken if stepped on.

SUMMARY OF THE INVENTION

Therefore, what is desired is a simple, cost effective method and apparatus for permitting the cover of the interceptor to be installed at grade, regardless of how deep the pipe connection is. It is also desirable for the cover to include a latch assembly for securing the cover to the grease interceptor in a quick and easy manner such that when the latch is in a secured position it does not project outwardly from the cover.

Accordingly, in one aspect, the present invention is directed to a riser kit for extending the upwardly extending walls of the grease interceptor. The riser kit comprises a continuous collar extension which is securable to the upper edge of the grease interceptor and which is easily and effectively adaptable to a range of heights. In another aspect the collar extension of the riser kit is comprised of at least two parts which include end engaging means to permit the parts to be engaged together to form a continuous collar extension.

Therefore, according to the present invention, there is provided a riser kit for a grease interceptor having upwardly extending walls, an open top and a cover to close the open top, the extender kit comprising:

at least one collar extension having:
  a lower edge for engaging an upper edge of the upwardly extending walls of the grease interceptor;
  a middle portion forming an upward wall extension for the grease interceptor; and
  a top edge sized and shaped to engage the cover to permit the cover to be secured to the extended grease interceptor; and
  a means to secure the collar extension to the grease interceptor.

Also, the cover of the riser kit is preferably provided with a latch assembly for securing the cover onto the extended grease interceptor. Therefore, according to the present invention, there is provided a latch assembly for securing a cover onto a container, the latch assembly comprising:

a catch member secured to the container transverse to a container wall at an upper end thereof;

a latch member pivotally mounted in an opening in the cover adjacent an edge thereof and positioned to register with the catch member;

the latch member having a hook portion and a lever portion wherein pivoting the lever portion when the cover is positioned on the container causes the hook portion to engage and disengage with the catch member.

In another aspect the present invention provides a method of installing a wastewater grease interceptor comprising the steps of:

positioning the grease interceptor as required to hydraulically connect the grease interceptor to a wastewater line;

determining a grade difference between a top of the grease interceptor and a finished floor grade; and adding a collar extension to the grease interceptor sized and shaped to permit the top of the grease interceptor to match the finished floor grade.

In another aspect the step of adding the collar extension further includes assembling the collar extension from at least two parts, and cutting the assembled collar extension to an appropriate height as required.

BRIEF DESCRIPTION OF THE DRAWINGS

Reference will now be made, by way of example only, to the drawings of the present invention, which illustrate the preferred embodiment, and in which:

FIG. 7 is a perspective inside view of the male and female end engaging portions of FIG. 5 subsequent to being engaged together to form the continuous collar extension;

DETAILED DESCRIPTION OF PREFERRED EMBODIMENTS

The present invention will now be described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers.

Figure 1:
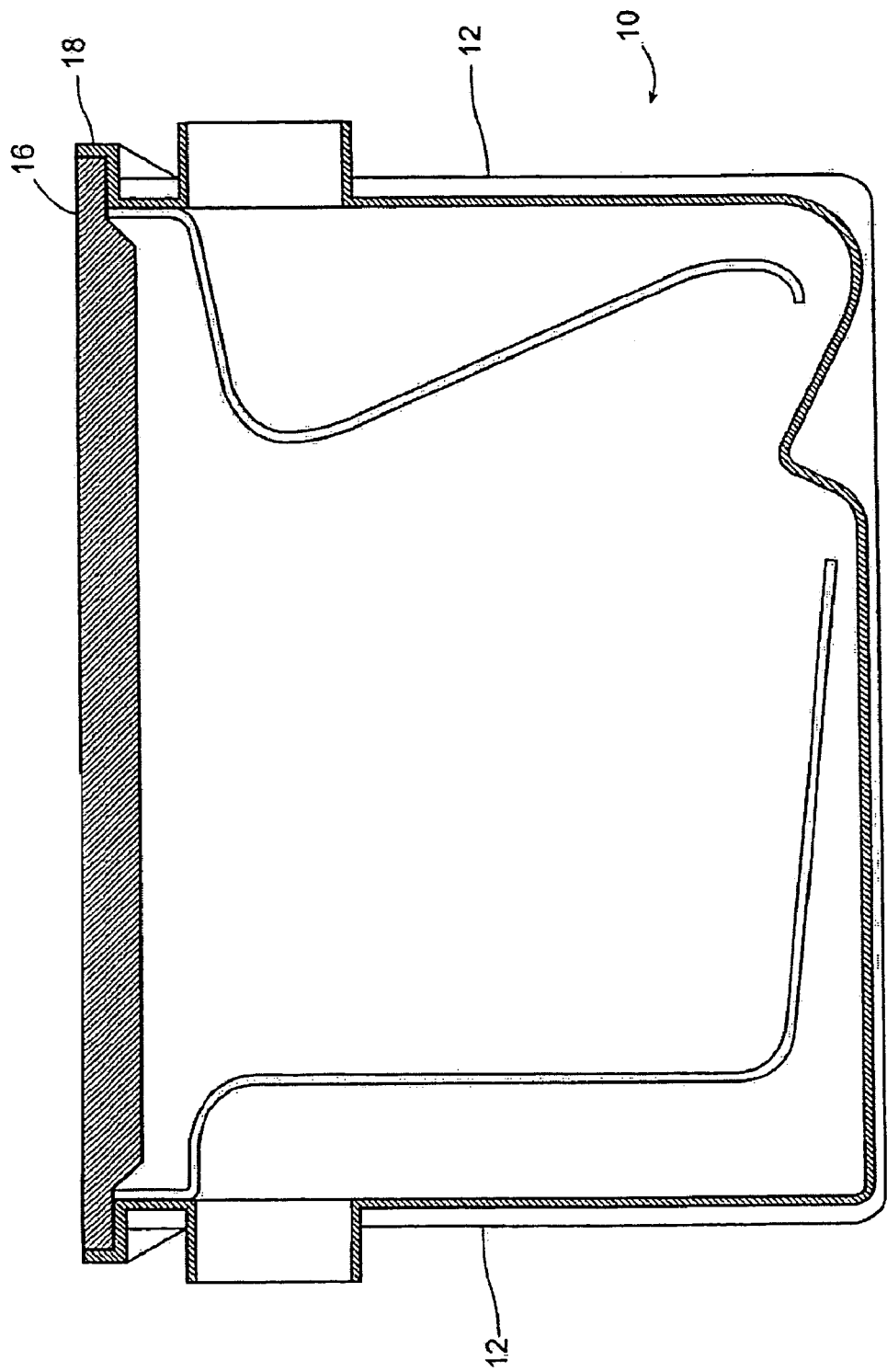
FIG. 1 is cross-sectional elevation view of a prior-art grease interceptor and cover.
Figure 2:
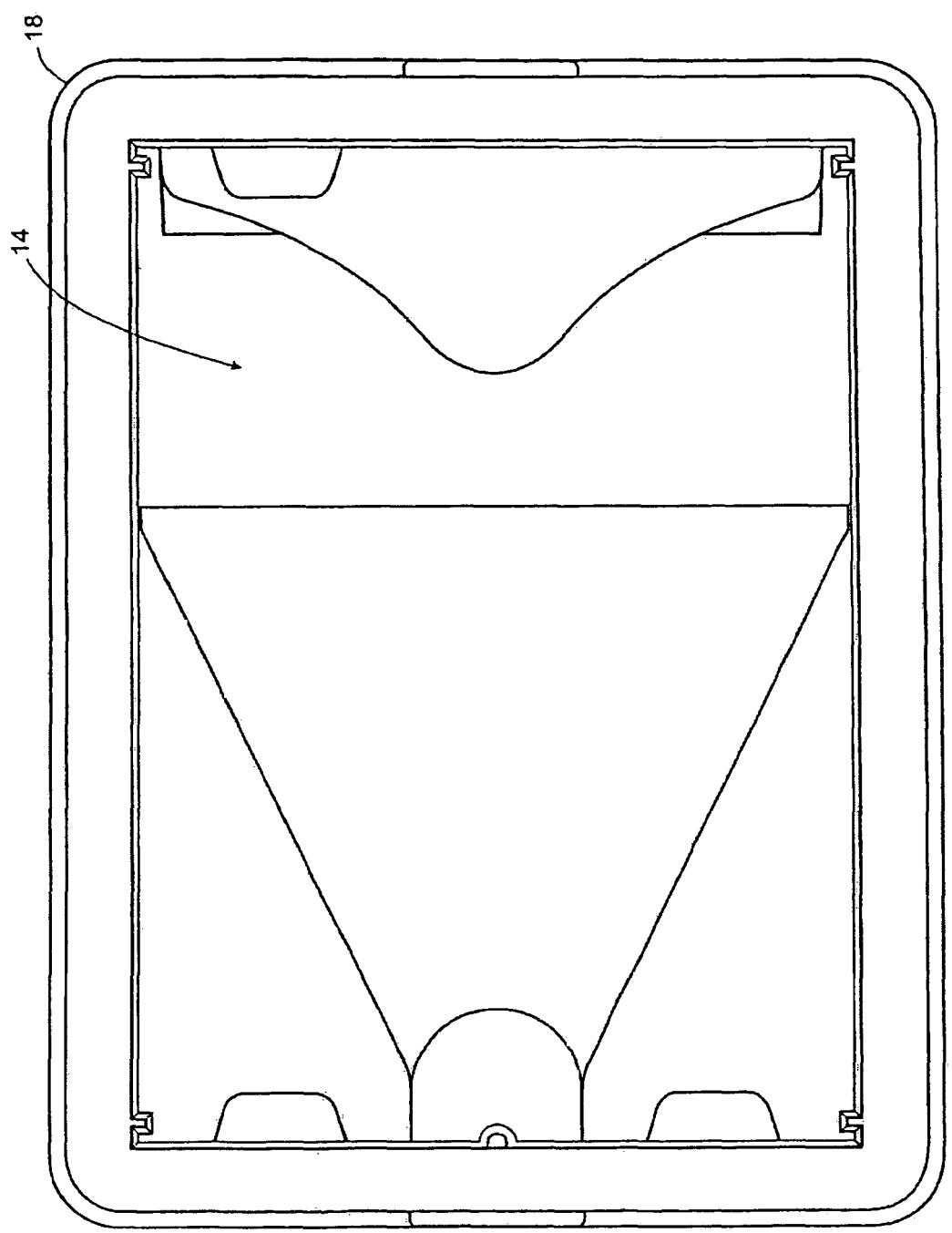
FIG. 2 is a top view of a prior art grease interceptor with the cover removed.

The riser kit of the present invention is for use with a grease interceptor 10, an example of which is shown in FIGS. 1 and 2. Such a grease interceptor has upwardly extending walls 12, an open top 14, an upper edge 18 and a cover 16 to close the open top 14 by securing to the upper edge 18. Such grease interceptors are well known in the art, and some examples include: Canadian Patent No. 2,299,134 and U.S. Pat. Nos. 3,847,814 and 7,011,752.

Figure 3:
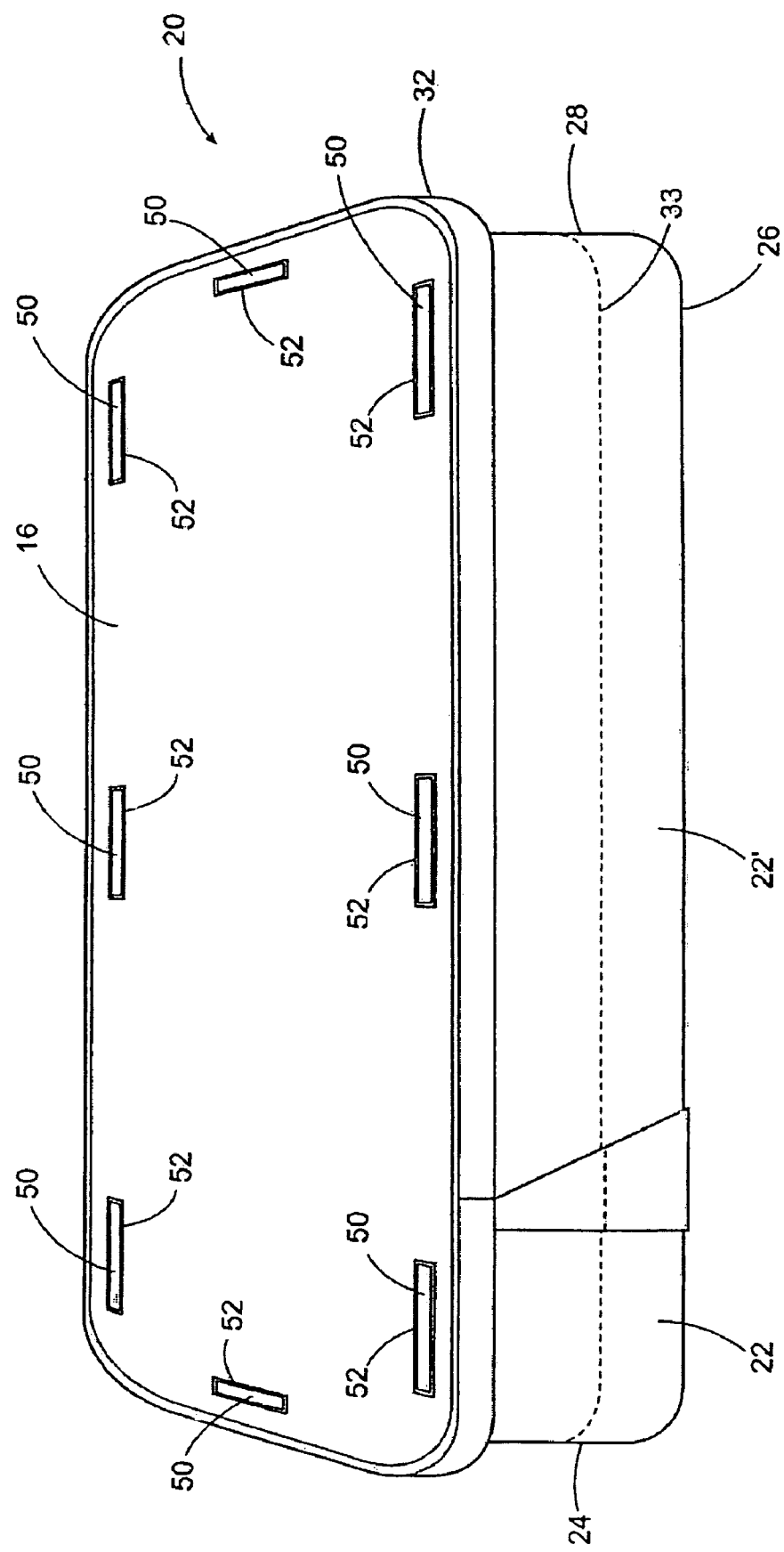
FIG. 3 is a perspective view of a cover and two parts of a continuous collar extension secured together according to an embodiment of the invention.
Figure 4:
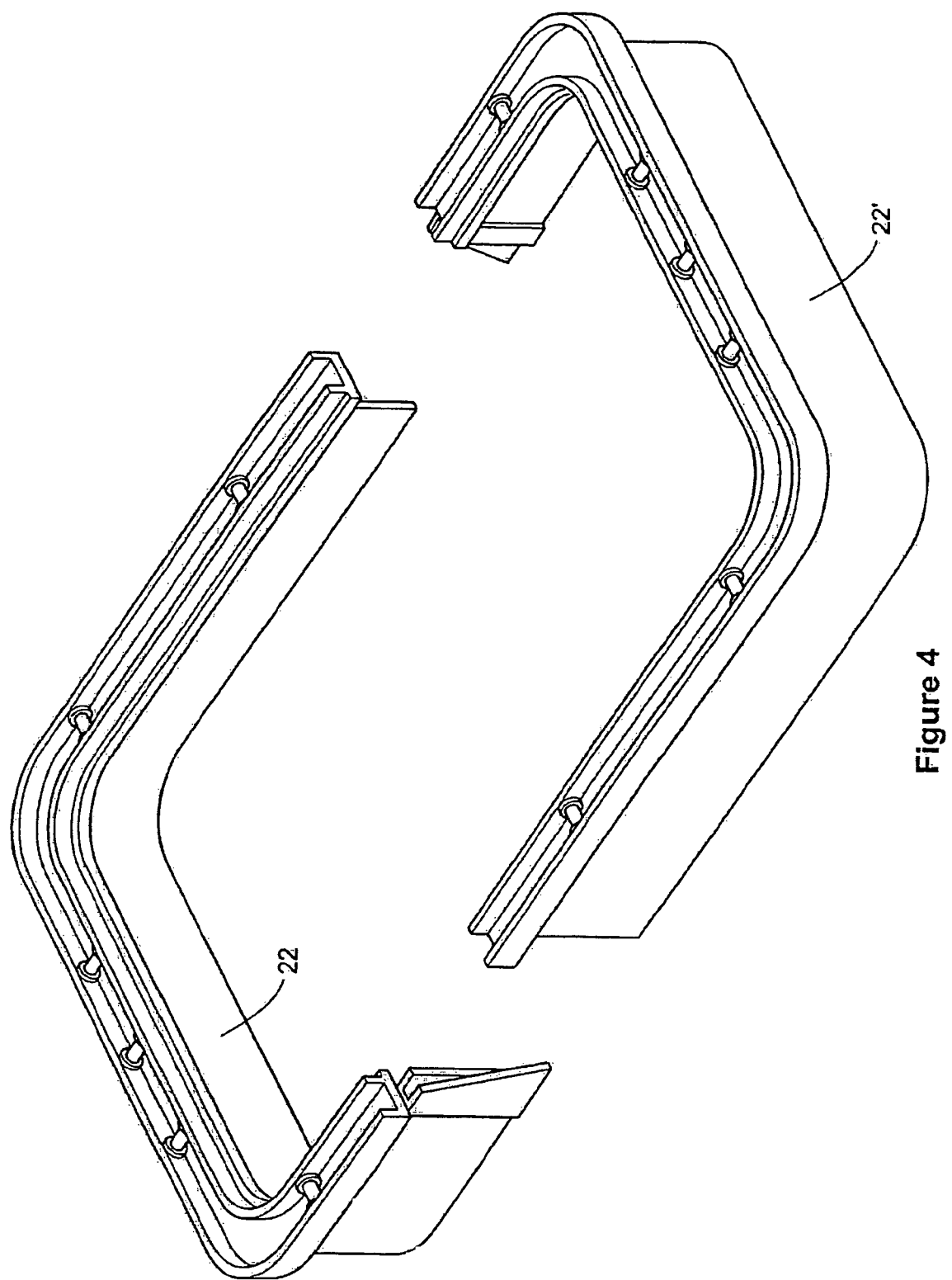
FIG. 4 is a perspective view of two parts of the collar extension of FIG. 3 prior to being engaged together.
Figure 5:
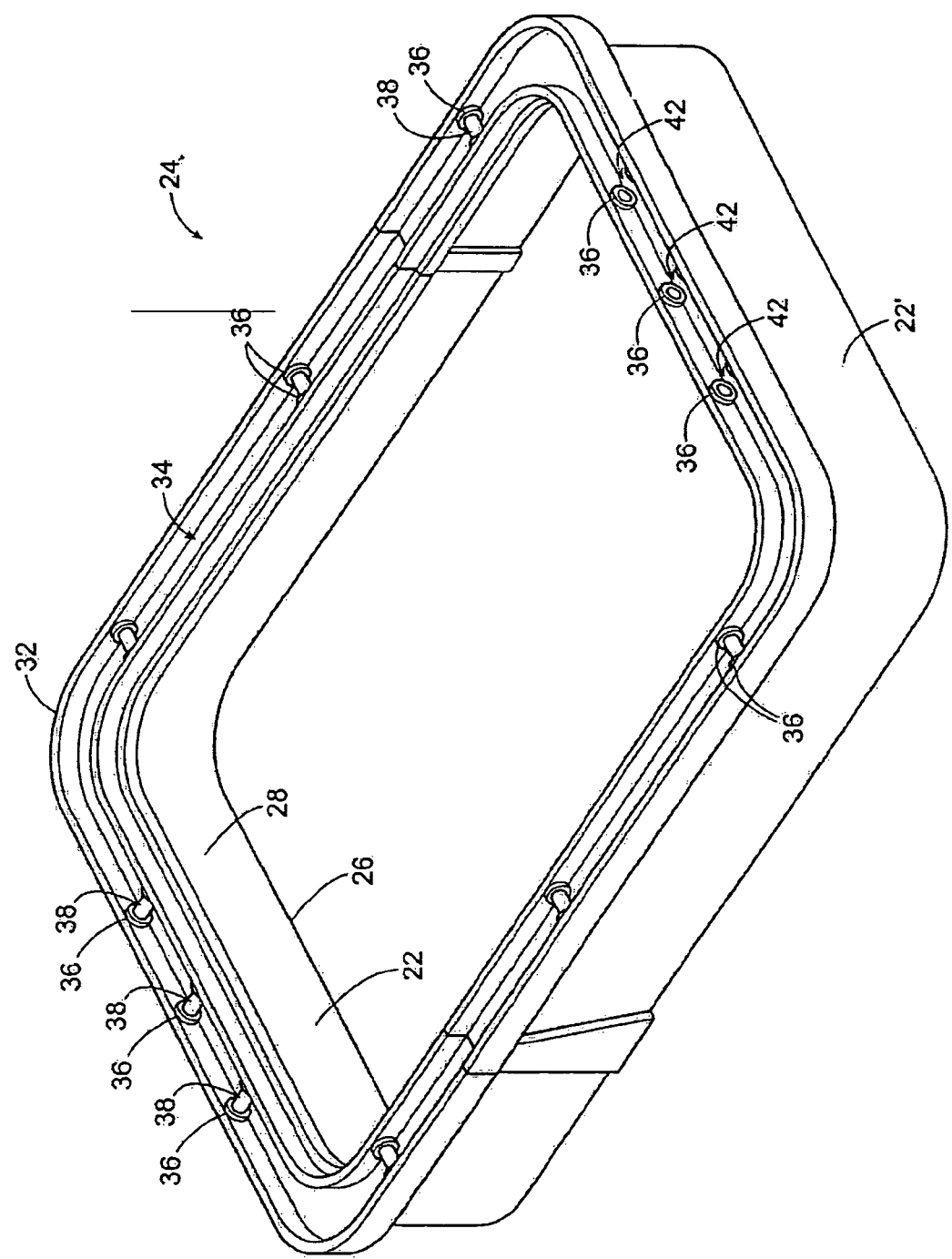
FIG. 5 is a perspective view of two parts of the collar extension of FIG. 4 subsequent to being engaged together to form the continuous collar extension.

FIG. 3 shows an assembled riser kit for a grease interceptor 10 according to the preferred embodiment of the present invention, which is generally indicated at 20. FIG. 4 shows in a top perspective view two parts 22, 22' of a continuous collar extension 24. As described later in more detail, these two parts 22, 22' engage together to form the continuous collar extension 24, which is shown in FIG. 5. The parts 22, 22' of the riser kit 20 may be made from any suitable material such as plastic, for example, by injection molding. The kinds of plastic used to mold the body of the grease interceptor, such as ABS, PP, PE, PPO, PA and PVC plastic provide adequate results.

As shown in FIG. 5, the riser kit 20 has at least one continuous collar extension 24 having a lower edge 26, a middle portion 28 forming an upward wall extension, and a top edge 32. The cover 16 may be secured to the top edge 34 of the continuous collar extension 24. However, the cover 16 need not be attached and it may just rest on the top edge 32 of the continuous collar extension 24, though this is not preferable, since the cover 16 may get accidentally knocked off.

The lower edge 26 of the continuous collar extension 24 is sized and shaped to engage the upper edge 18 of the upwardly extending walls 12 of the grease interceptor 10.

The middle portion 28 is preferredly thin and of a predetermined height. While any desired thickness can be used, the preferred thickness is one which is strong enough, having regard to the material from which it is made to stand up to the pressures of acting as a wall extension to the body of the grease interceptor, and yet which is thin enough to permit the height to be trimmed by use of a cutting blade or the like, at the installation site. While any suitable predetermined height may be used, the preferred height is one that corresponds to the biggest depth of burial below grade, as if it is too high for a given application it may be simply trimmed as needed. Thus it is preferred to provide one or more cutting guides 33 on the middle portion 28 to allow a user to easily trim the continuous collar extension 24 to a desired height. By way of example, the cutting guide 33 may include one or more graduated markings molded into, printed on, or affixed to the middle portion 28. The markings may also be printed on a label and affixed to the middle portion 28. What is important is that the preferred embodiment includes a cutting guide 33 on the middle portion 28 to which a user may refer when trimming the continuous collar extension 24.

Figure 6:
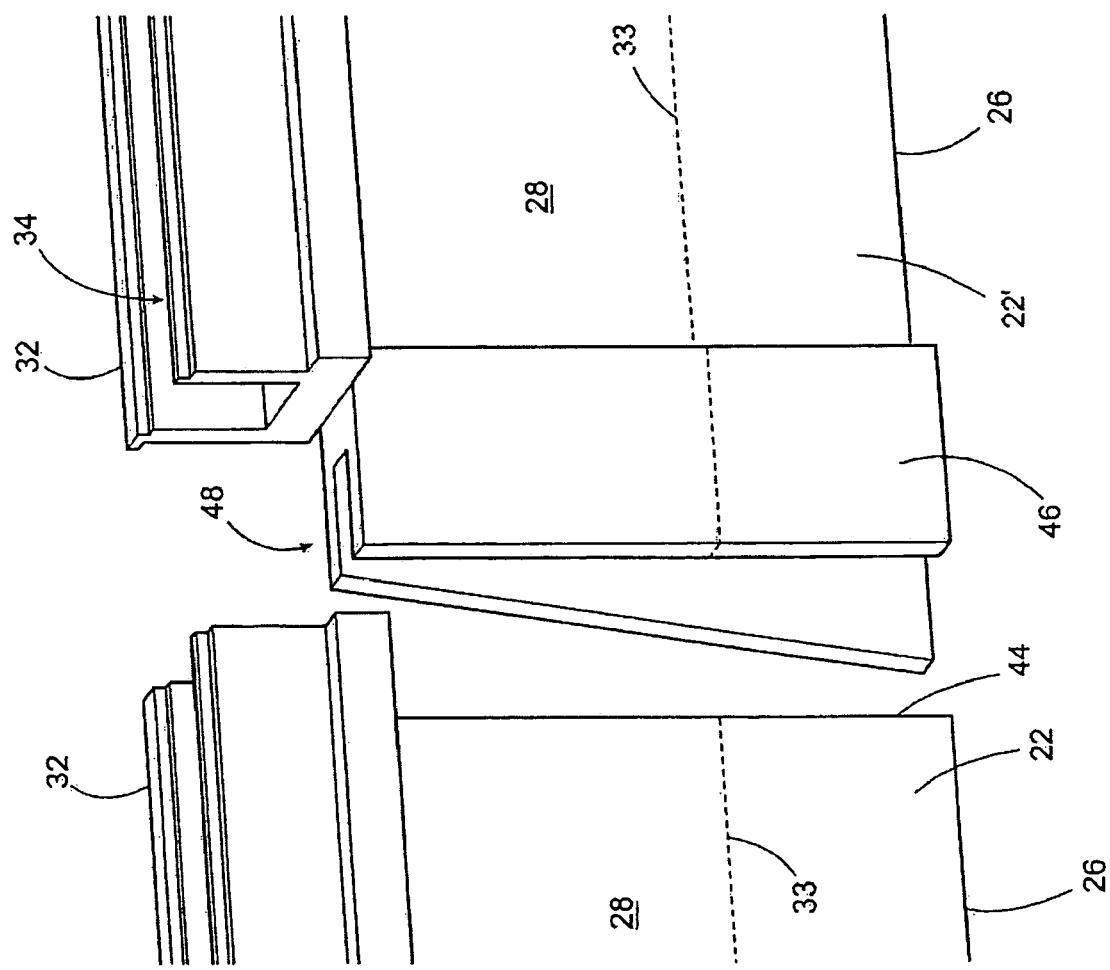
FIG. 6 is a perspective inside view of a male and a female end engaging portion of the two parts of the continuous collar extension of FIG. 4 prior to being engaged together.

The top edge 32 of the continuous collar extension 24 preferably comprises a U-shaped channel 34 as shown in FIGS. 5 and 6. Within the U-shaped channel 34 there are formed a plurality of paired housings 36 (see FIG. 5) for releasably holding pins 38, which are preferredly in the form of cylindrical dowels. These removable pins 38, which may be constructed of any material, including plastic and metal, are preferredly corrosion resistant. Accordingly, if the pins 38 are constructed of metal, stainless steel is preferable. Corrodible metals such as hardened steel may also provide suitable results if plated with a corrosion resistant metal such as nickel or chrome, or covered in a protective barrier such as paint or the like. However it is also contemplated that in less preferred embodiments the pins may be constructed of corrodible metals with no corrosion resistant properties.

The pins 38, which are preferably positioned transverse to the walls, of the continuous collar extension 24, and parts 22, 22' thereof, are catch members for use with a latch member 48 located on the cover 16, as will be described in detail later. With pin 38 removed, the space 42 between each pair of housings 36 must be sufficient to accept the width of the lower edge 26 of the continuous collar extension 24.

As mentioned above, the continuous collar extension 24 is preferably comprised of two identical matching parts 22, 22', which are engageable to form the continuous collar extension 24, as shown in FIGS. 4 and 5. However, the present invention is not limited to such an embodiment, as it is also contemplated that the continuous collar extension 24 may also be formed from a single part with a continuous wall surface, although this is not preferred. Forming the continuous collar extension 24 from at least two parts 22, 22' capable of being engaged together to form the continuous collar extension 24 has certain advantages. It allows for compact shipping of the riser kit 20, since the at least two parts 22, 22' may be packaged with the parts nested together. Furthermore, the molds for forming the parts 22, 22' will be smaller, less complicated and therefore less expensive to make.

As shown in FIG. 6, each part 22, 22' of the continuous collar extension 24 has end engaging means consisting of male and female end engaging portions, indicated at 44 and 46 respectively. The male and female end engaging portions 44, 46 permit the at least two parts 22, 22' of the continuous collar extension 24 to be engaged together to form the continuous collar extension 24 as described above.

The female end engaging portion 46 contains a slot 48 which is sized and shaped to accept the complementary male end engaging portion 44. According to a preferred embodiment the male end engaging portion 44 is a side edge of the middle portion 28 and the lower edge 26 of a part 22,22' of the continuous collar extension 24. It is contemplated that the male end engaging portion 44 may be angled (not shown), so long as it fits into a corresponding angled slot (not shown) in the female end engaging portion 46.

FIG. 7 shows the male and female end engaging portions 44, 46 of two parts 22,22' of the continuous collar extension 24 engaged together. In the preferred embodiment the engagements between the male and female end engaging portions 44, 46 are watertight. This may be accomplished by, for example, applying a compound such as silicone, adhesive or other sealing material, to the male and female end engaging portions 44, 46 prior to the engagement.

Figure 12:
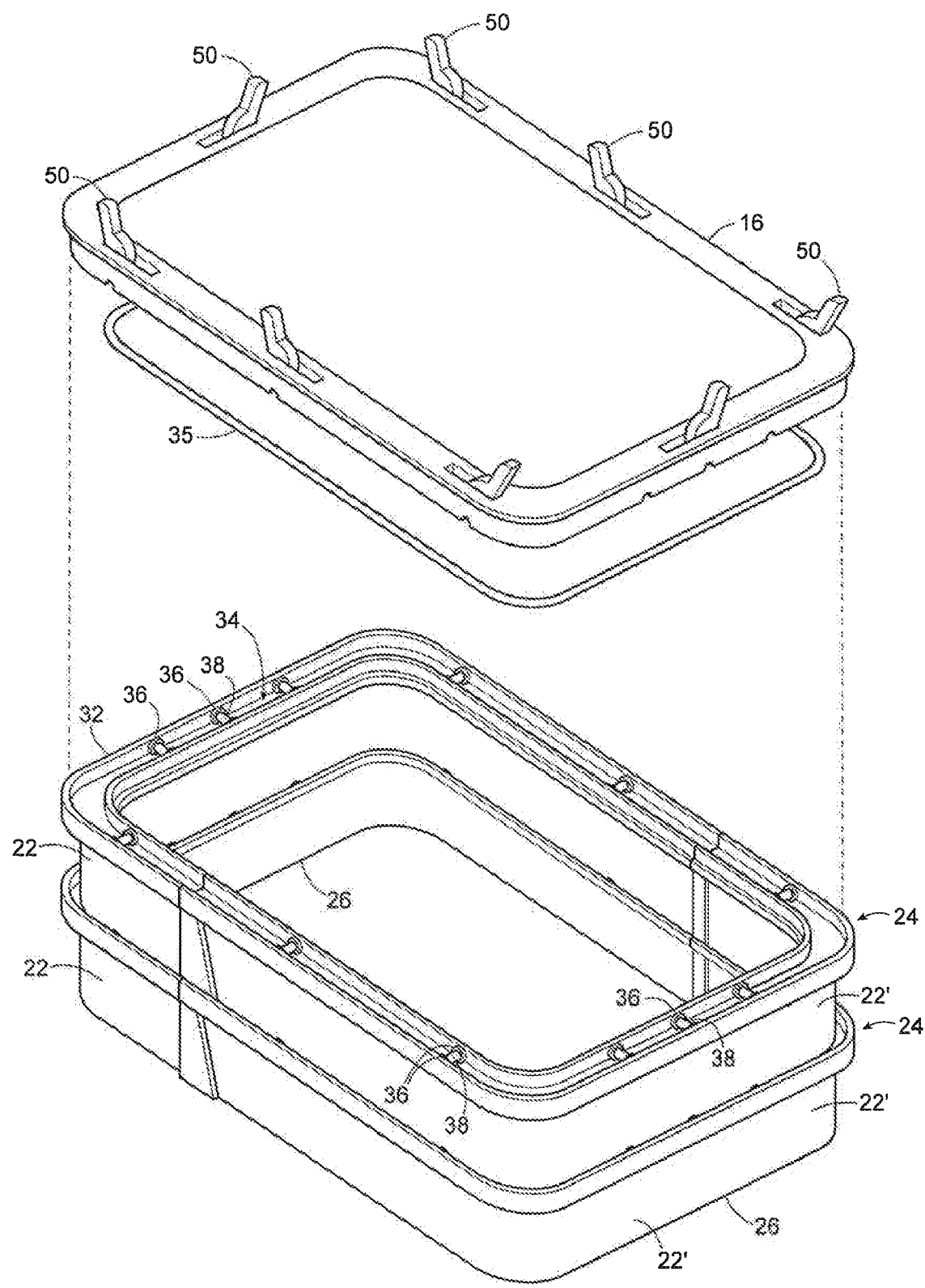
FIG. 12 is a perspective view of a cover and two stacked collar extensions prior to being sealed together according to an embodiment of the invention.

As shown in FIG. 12, it is contemplated that more than one continuous collar extension 24 may be used, stacked one on top of the other to extend the upwardly extending walls 12 of the grease interceptor 10 by more than the height of one continuous collar extension 24. When such a configuration is necessary, the pins 38 are retained only in a topmost continuous collar extension. It is also preferable that the engagement between the lower edge 26 of one continuous collar extension 24 and the top edge 32 of the next continuous collar extension be watertight. As will be understood by those skilled in the art, this may be accomplished by placing a gasket or a bead of silicone, or the like, (not shown) in the U-shaped channel 34 prior to the engagement. The engagement is preferably then secured by driving a threaded fastener, such as a screw, through the paired housings 36 and through the lower edge 26, which is positioned in the space 42 between each paired housing 36.

Figure 10:
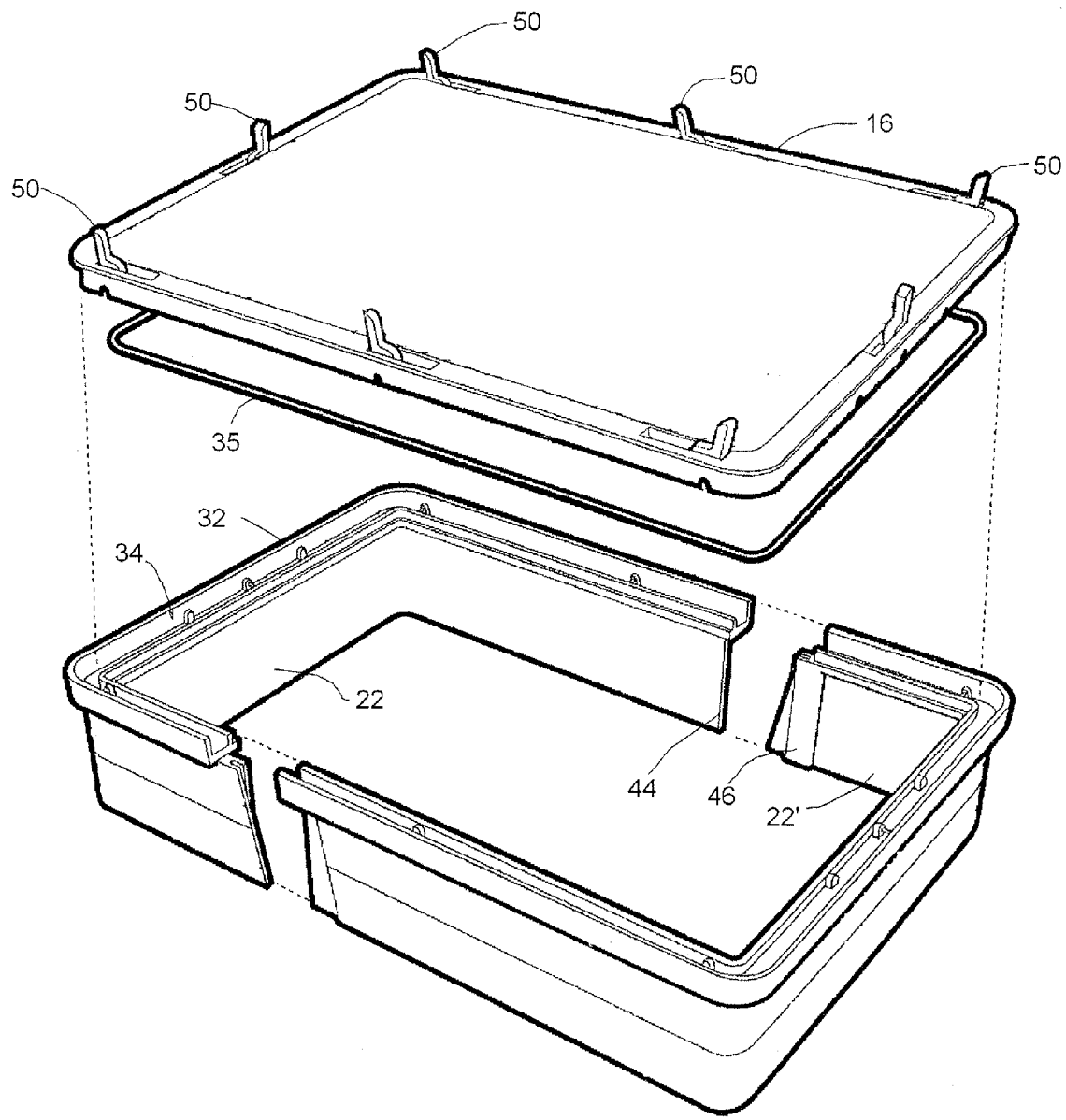
FIG. 10 is a perspective view of a cover and two parts of a continuous collar extension prior to being sealed together according to an embodiment of the invention.
Figure 11:
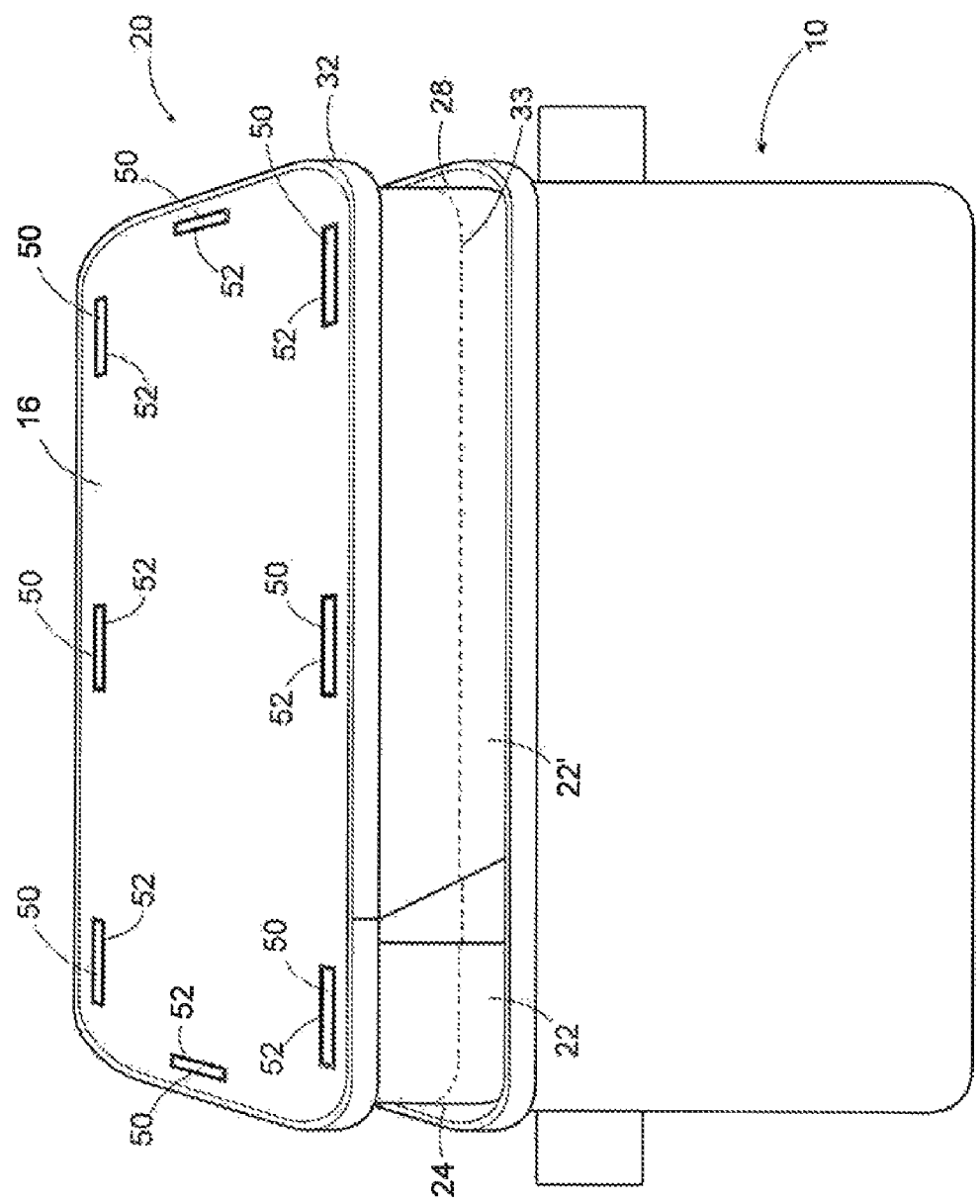
FIG. 11 is a side view of a grease interceptor assembly of the invention depicting a riser connected to a grease interceptor.

As shown in FIGS. 3 and 10, the riser kit 20 will preferably be compatible with a cover 16, detachably attached to the top edge 32 of the topmost continuous collar extension 24. A resilient sealing gasket 35 is also provided to make a good seal between the cover 16 and the top edge 32.

Figure 9:
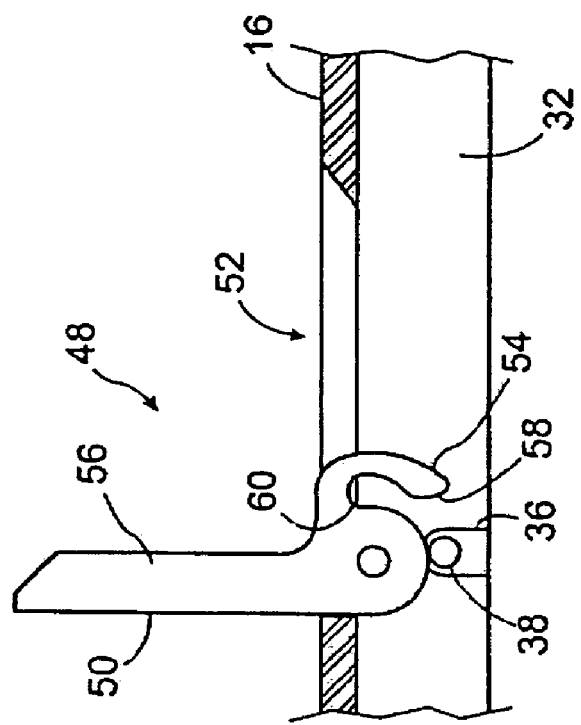
FIG. 9 is a side view of the latch assembly of FIG. 7 in a disengaged configuration.
Figure 8:
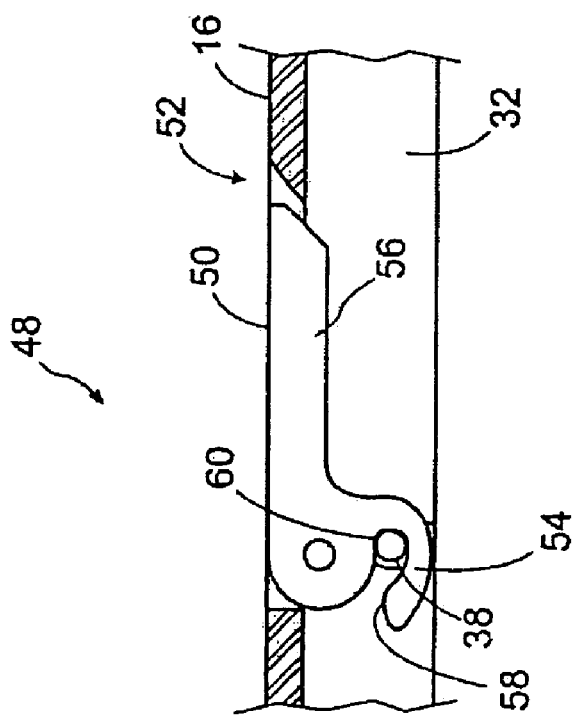
FIG. 8 is a side view of a latch assembly according to an embodiment of the present invention in an engaged configuration.

The riser kit 20 may include one or more latch assemblies, indicated generally at 48 for securing the cover 16 onto the top edge 32 of the continuous collar extension 24. As shown in FIGS. 8 and 9, each latch assembly 48 has a catch member and a latch member 50.

Each catch member is secured to the top edge 32 of the continuous collar extension 24. According to a preferred embodiment of the present invention the catch members are the metal dowel pins 38, which as described above, are retained in the paired housings 36 which are located in the U-shaped channel 34 of continuous collar extension 24, or only the topmost continuous collar extension when two or more continuous collar extensions are stacked one on top of the other. The pins 38 are preferably oriented transverse to the walls of the continuous collar extension 24.

Each latch member 50 is pivotally mounted in an opening in the cover 16, such as a slot 52, adjacent to an edge thereof, and each latch member 50 is positioned to register with a pin 38. The latch member 50 has a hook portion 54 and a lever portion 56. Pivoting the lever portion 56 when the cover 16 is positioned on the top edge 32 causes the hook portion 54 to engage and disengage with the pin 38. When the hook portion 54 is engaged with the pin 38 (see FIG. 8) the cover 16 is secured to the top edge 32, and when the hook portion 54 is disengaged from the pin 38 (see FIG. 9) the cover 16 is not secured to the top edge 32 and may be removed therefrom.

The hook portion 54 is preferably sized and shaped to draw the cover 16 onto the top edge 32 and compress the resilient sealing gasket 35 as the lever portion 56 is pivoted to engage the hook portion 54 with the pin 38. This may be accomplished by providing a curved catch member engaging surface 58 on the hook portion 56. To help retain the hook portion 54 on the pin 38, in the engaged configuration, the hook portion 54 includes a recess 60 at one end of the catch member engaging surface 58. The recess 60 is sized, shaped and positioned to cause the pin 38 to be retained in the recess 60 by the resiliency of the compressed gasket 35. The recess functions to prevent the hook portion 54 from disengaging the pin 38 without deliberate force being applied to the lever portion 56 of the latch member 50.

Preferably, as shown in FIG. 8, the lever portion 56 is substantially parallel with the plane of the cover 16 while the pin 38 engages the recess 60 in the hook portion 56. Most preferably, the lever portion 56 will also be completely within the slot 52 when the pin 38 engages the recess 60 in the hook portion 56.

However, it will be appreciated by those skilled in the art that, although preferable, the latch assembly 50 described above is not specifically required for the invention. For example, the cover 16 may be detachably attachable by any suitable means, such as, for example, quarter-turn fasteners at each corner of the cover which are well known in the art. "Quarter-turn fastener" refers to a fastener which is sized and shaped to grip the cover 16 to the top edge 32 when in its closed position. However, the fastener can be moved to an open position by swivelling it approximately 90°, or a quarter turn. In the open position, the cover 16 and top edge 32 are not held together. As a further example, the cover 16 may be detachably attachable by magnets attached to the cover 16 and top edge. It will also be appreciated that, though it is preferable for the cover 16 to be detachably attachable to the top edge 32, the cover 16 may be more permanently attached, such as, for example, by screws. This, however, is not preferred, since the process of emptying the grease interceptor 10 would be much more time consuming. Similarly, the cover 16 may not be attached at all (i.e. it may just rest on the top edge 32), though this is not preferable either, since the cover 16 may get jolted aside, and wastewater may then leak or spill over the top of the top edge 32.

Furthermore, while the latch assembly 48 has been described above in relation to the riser kit 20, it is contemplated that the latch assembly 48 may also be used to secure the cover 16 directly to the upper edge 18 of the grease interceptor 10. Accordingly, it will be understood that the grease interceptor 10 may be provided with an upper edge 18 comprising a U-shaped channel identical to the U-shaped channel 34 of the continuous collar extension 24. Accordingly, the U-shaped channel of the grease interceptor 10, may contain paired housings releasably retaining metal dowel pins. Such a configuration would allow the cover 16 to be secured directly to the upper edge 18 of the grease interceptor 10 by engaging the hook portions 54 of the latch members 50 with the pins 38.

In use, a user locates a wastewater outflow pipe at the location where the grease interceptor 10 is to be installed. The installer then excavates a hole in the ground around the wastewater outflow pipes. The hole should be dimensioned to be large enough to contain the grease interceptor 10 and deep enough so that the bottom of the grease interceptor 10 sits on the ground when it is connected to the wastewater outflow pipe. The upper edge 18 of the grease interceptor 10 is prepared for engagement with the lower edge 26 of the continuous collar extension 24. According to a preferred embodiment, the grease interceptor 10 is provided with an upper edge 18 which is identical to the top edge 32 of the continuous collar extension 24 as described above. In such a case the user must prepare the upper edge 18 by removing the pins 38 from each paired housing 36 using a hammer and a punch, or the like, to disengage the pins 38 from the housings 36 and using a pair of pliers remove the pins 38 from the housings 36 so that the space 42 between the housings 36 is not obstructed.

A section of the wastewater outflow pipe is removed and the grease interceptor 10 is hydraulically connected in line with the wastewater outflow pipe by means known in the art.

The user then determines a grade difference between the top of the upper edge 18 of the grease interceptor 10 and a finished floor grade.

A generous bead of silicone is applied to the male and female end engagement portions 44, 46 of the two parts 22, 22' of the continuous collar extension 24 and the two parts 22, 22' are joined together to form the continuous collar extension 24. If the grade difference between the top of the upper edge 18 of the grease interceptor 10 and the finished floor is lower than the height of the continuous collar extension 24, then the continuous collar extension 24 must be trimmed to the appropriate height. According to a preferred embodiment, the user may trim the continuous collar extension with reference to a cutting guide 33 located on the middle portion 28 of the continuous collar extension 24.

If the grade difference between the top of the upper edge 18 of the grease interceptor 10 and the finished floor is higher than the height of the continuous collar extension 24, then more than one continuous collar extension must be joined in stacked relation to achieve the appropriate height. In such a case it may be appropriate to trim the lowermost continuous collar extension to achieve the desired height.

The engagement between the upper edge 18 of the grease interceptor 10 and the lower edge 26 of the assembled and sized continuous collar extension should be water tight. Accordingly, a generous bead of silicone, or the like, is applied to the upper edge 18 of the grease interceptor 10 and the lower edge 26 of the assembled and sized continuous collar extension. The lower edge 26 of the assembled and sized continuous collar extension is the engaged with the upper edge 18 of the grease interceptor 10. Threaded fasteners, such as screws, may then be used to secure engagement.

In the case of a grease interceptor 10 which is provided with an upper edge 18 which is identical to the top edge 32 of the continuous collar extension 24, as described above, the lower edge 26 of the continuous collar extension is inserted in the space 42 between each paired housing 36 in the U-shaped channel 34 of the top edge 32 of the grease interceptor 10. The fasteners may be driven through the paired housings 36 and through the lower edge 26, which is positioned in the space 42 between each paired housing 36.

The user may then secure the cover 16 to the top edge 32 of the extended grease interceptor. According to the preferred embodiment, the cover is placed on the top edge 32 with the latch members 50 positioned in the disengaged configuration. The latch members 50 are then pivoted into the engaged configuration, thereby securing the cover 16 to the top edge 32 of the continuous collar extension 24. Removal of the cover 16 is accomplished by reversing the steps for securing the cover 16 to the top edge 32.

It will be appreciated by those skilled in the art that the riser kit 20 is used in a moist environment conducive to corrosion. Thus, the riser kit 20 is preferably composed of molded plastic to resist corrosion. The use of molded plastic is also preferable because it makes the riser kit 20 simpler and less expensive to manufacture than if metal were used. A reduction in corrosion can also be achieved through use of stainless steel, or another metal if coated or plated to inhibit corrosion.

While reference has been made to various preferred embodiments of the invention other variations are comprehended by the broad scope of the appended claims. Some of these have been discussed in detail in this specification and others will be apparent to those skilled in the art. All such variations and alterations are comprehended by this specification are intended to be covered, without limitation.

The embodiments of the invention in which an exclusive property or privilege is claimed are defined as follows:

1. In combination, a latch assembly, a cover, a grease interceptor with upwardly extending walls, and an extension of said grease interceptor walls, said latch assembly adapted to releasably secure said cover onto said extension without the use of a tool, said extension being attached to a top edge of the upwardly extending walls of said grease interceptor in a watertight manner, said extension having a wall for extending a height of said grease interceptor walls, the latch assembly comprising:

a catch member secured to said extension transverse to said wall of said extension at an upper end of said wall of said extension; and a latch member pivotally mounted to said cover adjacent an edge of said cover and positioned to register with said catch member;

said latch member having a hook portion and a lever portion, wherein pivoting said lever portion when said cover is positioned on said extension causes said hook portion to engage and disengage with said catch member;

wherein said extension comprises at least one collar extension, wherein said collar extension is comprised of at least two parts joined together and further comprising a sealing compound disposed between said at least two parts such that the two parts are joined together to be watertight.

2. A combination as claimed in claim 1, wherein said hook portion is sized and shaped to draw said cover onto said body or said extension as said lever portion is pivoted to engage said hook portion on said catch member.

3. A combination as claimed in claim 2, wherein said hook portion includes a recess to retain said catch member in place on said hook portion.

4. A combination as claimed in claim 3, wherein said lever portion is generally horizontal when said catch member engages said recess.

5. A combination as claimed in claim 3, wherein said lever portion is mounted within a slot in said cover, and is recessed within said slot when said catch member engages said recess in said hook portion.

6. A combination as claimed in claim 3, wherein a resilient sealing gasket is provided between said cover and said body or said extension and said latch assembly is sized and shaped to compress said gasket as said hook portion engages said catch member.

7. A combination as claimed in claim 6, wherein said recess on said hook portion is sized, shaped and positioned to cause said catch member to be retained in said recess by said resiliency of said compressed gasket.

8. A combination as claimed in claim 1, wherein said hook portion defines a curved catch member engaging surface to draw said cover onto said body or said extension as said hook portion engages said catch member.

9. A combination as claimed in claim 1, wherein said catch member is a cylindrical element removably retained in a catch member housing on said body or said extension.

10. A combination as claimed in claim 9, wherein said cylindrical element is a stainless steel pin.

11. A combination as claimed in claim 1, wherein said at least one collar extension comprises:
   a lower edge for engaging an upper edge of said upwardly extending walls of said grease interceptor;
   a middle portion forming an upward wall extension for said grease interceptor; and
   a top edge sized and shaped to engage said cover to permit said cover to be secured to said extended grease interceptor.

12. A combination as claimed in claim 11, wherein said middle portion includes one or more cutting guides for trimming said collar extension to a desired height.

13. A combination as claimed in claim 12, wherein said one or more cutting guides are (a) molded into said middle portion, (b) printed onto said middle portion, or (c) printed onto a label which is affixed onto said middle portion.

14. A combination as claimed in claim 11, wherein said top edge includes a plurality of housings each of which is sized and shaped to releasably retain a catch member.

15. A combination as claimed in claim 14, further including a plurality of catch members retained in said plurality of housings.

16. A combination as claimed in claim 15, wherein said cover includes a plurality of latch elements sized and shaped to register with and engage said catch members to secure said cover to said collar extension.

17. A combination as claimed in claim 16, wherein more than one collar extension can be used, stacked one upon the other, and wherein said catch members are retained in a top most collar extension.

18. A combination as claimed in claim 1, wherein each of said at least two parts includes an end engaging portions to permit said parts to be engaged together to form a continuous collar extension.

19. A combination as claimed in claim 18, wherein said end engaging portions are in the form of male and female engaging portions.

20. A combination as claimed in claim 18, wherein each of said at least two parts includes both a female end engaging portion and a male end engaging portion.

21. A combination as claimed in claim 20, wherein said male end engaging portion is angled, and fits into an angled slot in said female end engaging portion.

22. A combination as claimed in claim 1, wherein said at least two parts are sized and shaped to nest together for compact shipping of said riser kit.

23. A combination as claimed in claim 1, wherein each of said at least two parts are substantially identical.

24. A combination as claimed in claim 23, wherein said substantially identical parts are molded from plastic.

25. The combination of claim 1, wherein said sealing compound comprises silicone or an adhesive.

26. A method of installing, in combination, a latch assembly, a cover, a grease interceptor with upwardly extending walls, and an extension of said grease interceptor walls, comprising the steps of:
   a) positioning said grease interceptor as required to hydraulically connect said grease interceptor to a wastewater line;
   b) determining a grade difference between a top of said grease interceptor and a finished floor grade; and
   c) adding a collar extension to said grease interceptor sized to permit said top of said grease interceptor to match said finished floor grade, wherein said collar extension is comprised of at least two parts joined together and further comprising a sealing compound disposed between said at least to parts such that the two parts are joined together to be watertight;
   wherein said extension is attached to a top edge of the upwardly extending walls of said grease interceptor, said extension having a wall for extending a height of said grease interceptor walls, and the latch assembly comprising:
   a catch member secured to said extension transverse to said wall of said extension at an upper end of said wall of said extension; and
   a latch member pivotally mounted to said cover adjacent an edge of said cover and positioned to register with said catch member;
   said latch member having a hook portion and a lever portion, wherein pivoting said lever portion when said cover is positioned on said extension causes said hook portion to engage and disengage with said catch member.

27. A method of installing the combination as claimed in claim 26, wherein said step of adding said collar extension further includes assembling said collar extension from at least two parts, and cutting said assembled collar extension to an appropriate height as required.

28. A method of installing a wastewater grease interceptor as claimed in claim 27, wherein a middle portion of said wastewater grease interceptor includes one or more cutting guides for trimming said collar extension to a desired height, and said step of cutting said assembled collar extension to said appropriate height includes the step of referring to said one or more cutting guides.

29. A method of installing the combination as claimed in claim 28, wherein said step of adding said collar extension further includes sealing and fastening said collar extension to a top of said grease interceptor.

30. A method of installing the combination as claimed in claim 29, wherein said step of adding said collar further includes sealing said parts of said collar together.

31. A latch assembly for releasably securing a cover onto an extension of a grease interceptor without the use of a tool, said extension being attached to a top edge of said grease interceptor in a watertight manner, said extension having a wall for extending a height of said grease interceptor, the latch assembly comprising:
  a catch member secured to said extension transverse to said wall of said extension at an upper end of said wall;
  a latch member pivotally mounted to said cover adjacent an edge of said cover and positioned to register with said catch member,
  said latch member having a hook portion and a lever portion, wherein pivoting said lever position when said cover is positioned on said extension causes said hook portion to engage and disengage with said catch member;
  wherein said extension comprises at least one collar extension, wherein said collar extension is comprised of at least two parts joined together and further comprising a sealing compound disposed between said at least two parts such that the two parts are joined together to be watertight.

32. A latch assembly for securing a cover onto an extension of a grease interceptor, said extension being attachable to a top edge of said grease interceptor in a watertight manner, said extension having a wall for extending a height of said grease interceptor, the latch assembly comprising:
  a catch member secured to said extension transverse to said wall of said extension at an upper end of said wall;
  a latch member pivotally mounted to said cover adjacent an edge of said cover and positioned to register with said catch member,
  said latch member having a hook portion and a lever portion, wherein pivoting said lever position when said cover is positioned on said extension causes said hook portion to engage and disengage with said catch member,
  wherein said extension comprises:
    a lower edge for engaging an upper edge of said grease interceptor;
    a middle portion forming an upward wall extension of said grease interceptor; and
    a top edge sized and shaped to engage said cover and allow said cover to be secured thereto;
  wherein said extension is comprised of at least two parts, each of said at least two parts being substantially identical and formed from molded plastic, and further comprising a sealing compound disposed between said at least two parts such that the two parts are joined together to be watertight.

* * * * *